United States Patent [19]
Zhang et al.

[11] Patent Number: 5,245,966
[45] Date of Patent: Sep. 21, 1993

[54] CONTROL SYSTEM FOR A DRIVE UNIT IN MOTOR VEHICLE

[75] Inventors: Hong Zhang, Bietigheim-Bissingen; Martin Streib, Vaihingen/Enz, both of Fed. Rep. of Germany

[73] Assignee: Robert Bosch GmbH, Stuttgart, Fed. Rep. of Germany

[21] Appl. No.: 993,060

[22] Filed: Dec. 18, 1992

[30] Foreign Application Priority Data

Dec. 19, 1991 [DE] Fed. Rep. of Germany ....... 4141947

[51] Int. Cl.⁵ .............................................. F02D 11/10
[52] U.S. Cl. ..................................... 123/339; 123/350; 123/399
[58] Field of Search ................ 123/399, 339, 350, 340

[56] References Cited

U.S. PATENT DOCUMENTS

| | | | |
|---|---|---|---|
| 4,765,296 | 8/1988 | Ishikawa et al. | 123/399 |
| 4,853,720 | 8/1989 | Onari et al. | 123/350 |
| 5,002,028 | 3/1991 | Arai et al. | 123/399 |
| 5,078,109 | 1/1992 | Yoshida et al. | 123/399 |

*Primary Examiner*—Andrew M. Dolinar
*Attorney, Agent, or Firm*—Walter Ottesen

[57] ABSTRACT

The invention is directed to a control system for a drive unit wherein a pregiven torque occurring at the output of the drive unit is pregiven and is adjusted at the output of the drive unit on the basis of engine speed, engine temperature, the status of additional consumers and/or a measure for the air throughput independent of engine speed, temperature and/or air density.

11 Claims, 3 Drawing Sheets

CONTROL SYSTEM FOR A DRIVE UNIT IN MOTOR VEHICLE

FIELD OF THE INVENTION

The invention relates to a control system for a drive unit and especially for an engine in a motor vehicle.

BACKGROUND OF THE INVENTION

German published patent application 4,037,237 describes a control system for a drive unit wherein a desired output torque of the drive unit including a transmission is pregiven in dependence upon the position of the accelerator pedal. A gear position of the transmission is determined and set in dependence upon this desired output torque and the engine torque is influenced in accordance with a setting of this desired output torque. The desired engine torque to be set is thereby determined from the desired output torque, output rotational speed and transmission ratio via a characteristic field. The open-loop control of engine power parameters such as throttle-flap position or fuel metering then takes place likewise via a characteristic field in dependence upon desired torque and engine speed.

However, the above published patent application does not provide information with respect to the procedure for making the desired engine torque available.

SUMMARY OF THE INVENTION

In view of the foregoing, it is an object of the invention to provide a procedure by means of which a pregiven torque can be effectively made available at the output of an engine.

This is achieved in that means are provided to which a desired value for the output torque of the engine is supplied as well as further operating variables of the engine and/or of the motor vehicle such as engine speed, engine temperature, a measure for the air throughput through the engine and/or the status of consumers such as air conditioners, power steering and the like. These means determine, on the basis of these variables, at least one desired value for one of the parameters influencing the power of the engine in such a manner that the torque occurring at the output of the motor for constant desired torque pregiven by the operator via the accelerator pedal is independent of the operating conditions present such as engine speed, temperature, load condition, operating state and/or air density.

U.S. Pat. application Ser. No. 863,006, filed Apr. 6, 1992, describes an electronic control system for motor vehicles wherein a drive unit (motor and transmission) is controlled essentially in dependence upon the driver's command with a desired value being determined for the torque supplied by the engine at its output shaft (the so-called desired coupling torque).

By using the coupling torque to be supplied as a desired value for the drive unit, a general variable is applicable for all engine types such as Otto engines and Diesel engines or electric motors as an interface to the motor. In this way, for example, measures for adjusting the desired coupling torque can be used independently of the type or independently of the configuration of the drive unit for the particular motor type.

The basic concept is that the adjustment of the power parameters for supplying the wanted desired coupling torque takes place on the basis of the load conditions of the engine while considering losses and efficiency of the engine. In this way, the desired coupling torque can be adjusted independently of the operating conditions present.

It is advantageous for this purpose to subdivide the torque to be provided into an indexed component and a component generated by losses. The subdivision finally makes possible a determination of the power parameter on the basis of only two variables, namely the indexed desired torque and the engine speed. The indexed torque then defines the torque generated by combustion.

The linear addition of the torque requirement of, for example, an idle controller and other ancillary consumers to the coupling desired torque or to the indexed desired torque is made possible by the determination of the power parameter for adjusting the wanted desired torque on the basis of the torque components. The engine efficiency is dependent on load and engine speed and is considered for the determination of the torque components. For this reason, the linear addition of these amounts leads to an almost error-free result.

The independence of the air density of the adjusted torque value is ensured by the comparison of the determined air-mass desired value with the measured air-mass actual value and the consideration of the difference between these two values when adjusting the power parameter or parameters.

It is also advantageous that the torque supplied by the engine is known and can be applied in combination with the transmission control as described in the state of the art mentioned above.

Functions such as drive slip control, engine intervention of the transmission control and/or road-speed control can be included in correspondence to the linear addition of the quantities described above.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
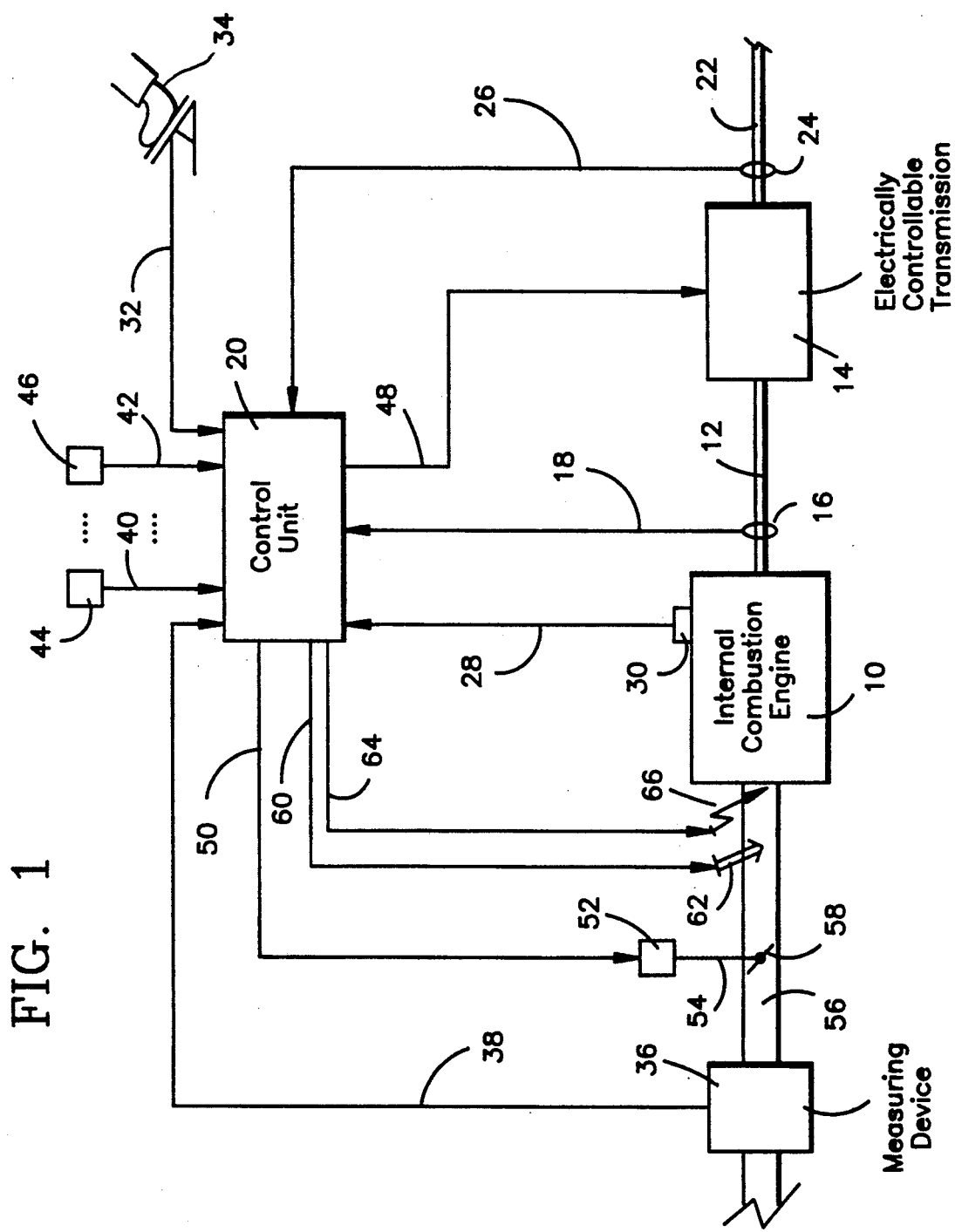
FIG. 1 is a block circuit diagram of a control system for a drive unit.

FIG. 1 shows an engine 10 which is connected via a drive shaft 12 to an electrically controllable transmission 14. The rotational speed of the shaft 12 is the same as the engine speed and is detected by a measuring device 16 and supplied via a line 18 to a control unit 20. A shaft 22 defines the output shaft of the transmission 14. A measuring device 24 detects the output rotational speed. A line 26 connects the measuring device 24 to the control unit 20.

The line 28 is a further input line of the control unit 20 and connects the control unit 20 to a measuring device 30 for detecting the temperature of the engine 10. A line 32 connects the control unit 20 to an operator-actuable element 34 such as an accelerator pedal. The position of the operator-actuable element 34 and therefore the command of the driver is transmitted via the line 32 to the control unit 20. A measuring device 36 detects the air throughput through the engine 10 and a connecting line 38 leads from the measuring device 36 to the control unit 20. Further input lines 40 to 42 connect the control unit 20 to measuring devices 44 to 46, respectively, and supply the control unit with additional operating variables of the engine and/or of the motor vehicle.

The output line 48 of the control unit 20 connects the control unit to the electrically controllable transmission 14. A further output line 50 connects the control unit 20 to an adjusting device 52 which actuates a throttle flap 58 mounted in the intake system 56 of the engine 10 via the connection 54. Furthermore, the output line 60 connects the control unit 20 to means 62 for influencing the fuel metered to the engine; whereas, the output line 64 connects the control unit 20 to means 66 for adjusting the ignition time point.

The control unit 20 forms drive signals for actuating the electrically controllable transmission 14 as well as the power of the engine 10 in dependence upon the driver command as well as upon the other operating variables applied. The power of the engine can be influenced by means of the following: actuating the throttle flap 58, influencing the fuel metering and/or influencing the ignition time point.

The control of the transmission and engine power takes place in a manner known basically from the state of the art referred to above.

A so-called output desired torque is formed from the driver's command and the output rotational speed and this desired value is adjusted by controlling the transmission and the engine power. A desired transmission value is supplied to the electrically controllable transmission whereas, a desired value for the engine torque to be supplied or for the coupling torque occurring at the output of the engine is transmitted to the engine control. This desired value is adjusted as will be described below.

Figure 2:
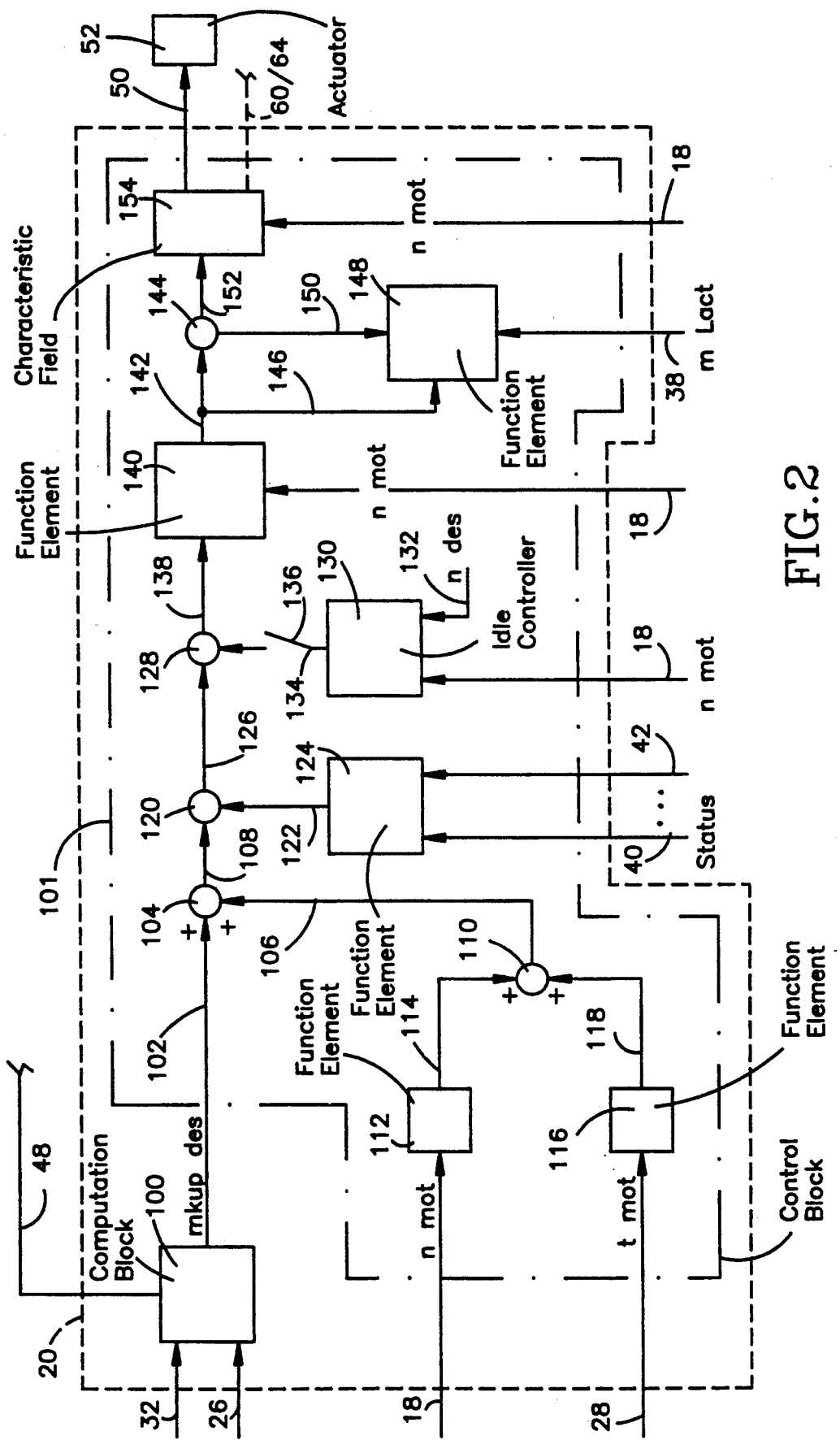
FIG. 2 is an overview block circuit diagram of the control system.

In FIG. 2, an advantageous embodiment of the control unit 20 is shown and is based upon the operation described above. Accordingly, for the same elements, the same reference numerals will be used as were used with respect to the description of FIG. 1.

The driver command is supplied via line 32 and the output rotational speed of the drive unit is supplied via line 26. In dependence upon the driver command and output rotational speed, a desired transmission ratio is computed in a first computation block 100 for the electrically controllable transmission 14 as well as a desired coupling torque which is computed in the manner disclosed in U.S. Pat. application Ser. No. 863,006, filed Apr. 6, 1992, and incorporated herein by reference. The desired transmission ratio is supplied by the control unit 20 via the output line 48 to the electrically controllable transmission 14; whereas, the desired value for the coupling torque (mkupdes) is emitted by the computation block 100 to the control block 101.

The use of a desired value for the coupling torque is based upon the recognition that the coupling torque represents the actual torque supplied by the engine and therefore defines the engine variable relevant with respect to the drive chain. The most precise determination of this coupling torque (that is of the torque supplied by the engine to the drive chain) in dependence upon the driver command is therefore a basic requirement imposed on an optimal motor-vehicle control.

In order to adjust the desired coupling torque via control of the engine power, lost torque and the efficiency of the engine must be considered in addition to the torque component developed by combustion or the physical operation of generating power. For this reason, at logic point 104, a value present on line 106 for the drag torque is added to the desired value of the coupling torque supplied via the line 102. The drag torque is the torque developed by the engine because of friction losses which cannot be supplied to the output shaft of the engine. The sum of these two values yields a value for the desired indexed engine torque, that is, that torque which is necessary for adjusting the desired coupling torque while considering the drag torque and which must be generated by the combustion operations or corresponding power-generating operations provided in other drive types.

The value of the engine drag torque comprises essentially a rotational speed component and a component dependent upon engine temperature. The value detected by the measuring device 16 for the output speed of the engine is supplied via the line 18 to a function element 112 which represents a characteristic field or a characteristic line. There, the engine-speed dependent value of the engine drag torque is stored in dependence upon engine speed.

The value generated by the measuring device 30 for the engine temperature is transmitted in a corresponding manner via the line 28 to a function element 116. This function element 116 likewise includes a characteristic field or characteristic line and represents the temperature-dependent components of the engine drag torque.

A line 114 leads from function element 112 to the logic position 110 and a line 118 leads from function element 116 also to logic position 110. The determined values of the speed-dependent component and of the temperature-dependent component of the engine drag torque are logically combined in the logic position 110 to a value for the lost torque of the engine. The line 106 connects the logic positions 110 and 104.

The characteristic lines or characteristic fields for the engine drag torque are then determined experimentally and are applied for each corresponding motor type or motor vehicle type. To correct changes of the assignment of the engine speed or engine temperature to particular torque components, the characteristic lines or characteristic fields are corrected or adapted in characteristic operating points. Such an operating point is the unloaded idle operation with reference to the speed-dependent component. The engine then rotates at a pregiven engine speed and the generated engine power operates exclusively for overcoming friction losses. The adjusted power parameter (fuel quantity, air quantity) then defines a measure for the speed-dependent lost torque component which operates as the basis for correcting the characteristic line or characteristic field.

The engine drag torque value increases with engine speed, that is, it becomes greater in amount. The stored values of the speed-dependent component of the engine drag torque apply for an operationally-warm engine.

An analog procedure is followed with respect to the temperature-dependent component. These values too are determined and applied in an experimental manner with the temperature-dependent component of the engine drag torque being zero for an operationally-warm engine.

The addition of the desired coupling torque and the lost torque in the logic position 104 provides a coarse value for the indexed engine torque; that is, a measure for the torque to be developed by the engine-power generation (combustion) which is realized by adjusting the power parameters and serves for making the desired coupling torque available.

A line 108 leads from logic position 104 to logic position 120. A line 122 from a function element 124 leads to logic position 120. The input lines 40 to 42 are connected to function element 124.

The function element 124 defines a characteristic line or table or characteristic field by means of which the contributions of ancillary equipment such as air conditioner, generator, power steering et cetera are considered with respect to lost torque of the engine. The particular status of this ancillary equipment is supplied via lines 40 to 42 from corresponding measuring units 40 to 46, respectively, to function element 124. The additive amount to the loss element is determined in function element 124 in dependence upon the measured variables.

This characteristic line/table/characteristic field is likewise determined experimentally in accordance with the power requirement of the particular ancillary equipment. The torque requirement of the ancillary equipment is added one to the other. The more power needed for an ancillary equipment, the greater is the torque value supplied on the line 122 to the logic position 120.

In the logic position 120, the value for the torque requirement of the ancillary equipment is added to the value of the indexed torque determined in the logic position 104. In this way, a measure is provided for the torque to be developed by the engine under the load conditions present.

A line 126 connects the logic position 120 to the logic position 128. A line 134 from a function element 130 is connected to the logic position 128.

The function element 130 then defines an idle controller and the logic position 128 is provided to consider the influence of the idle controller on the torque (to be supplied by the engine) for adjusting the desired coupling torque.

A value of the engine speed is supplied from measuring device 16 via line 18 to the idle controller 130; whereas, a corresponding desired value is supplied via line 132 to the idle controller 130. This desired value is then, for example, dependent upon the battery voltage. The idle controller 130 forms an output signal based on the difference between the desired and actual values of the engine speed and this output signal represents a torque requirement which is necessary to compensate for the difference between the desired and actual speeds. This value is converted into an additive correction value in accordance with a pregiven requirement and supplied via line 134 and the switch element 136 to the addition position 128. The switch element 136 is then closed in the known manner in the idle state. A charge control can be provided in addition to the speed control.

The line 138 leads from the logic position 128 to the function element 140 which defines a characteristic field.

In function element 140, the determined value of the indexed engine torque is converted into a corresponding parameter for influencing the power of the engine. This parameter can be the air mass to be supplied or the fuel mass to be metered, that is, a throttle-flap angle desired value or a fuel-quantity desired value.

For this purpose, a measure for the instantaneous engine speed is supplied via the line 18 to the function element 140. A value for the operating parameter(s) is read out of the characteristic field in dependence upon determined engine-torque desired value and the engine speed. The characteristic field is determined for an operationally-warm engine from measurements of the following: the torque supplied by the crankshaft; the coupling torque; the mass of fuel injected per work stroke or the air mass drawn in by suction per work stroke; and, the engine speed. These measured values are also measured in overrun operation which considers the drag-torque component. Ancillary equipment should not be switched on when determining the characteristic field.

A line 142 leads from the function element 140 to the logic position 144 whereas a line 146 leads from function element 140 to function element 148.

One of the most significant disturbing variables for a control of an engine is the variable air density which leads to different air-mass values for given engine speed and throttle-flap position. Accordingly, a correction characteristic field is provided in function element 148. The measured air-mass value is supplied to this characteristic field via the line 38 which is either determined directly via an air-mass sensor of the load-detecting system or via the load correction with $\alpha/n/$lambda systems. Furthermore, a measure for the power parameter(s) to be adjusted is supplied to the characteristic field via the line 146 or, in the case of a throttle-flap control, the air-mass desired value to be adjusted.

The function element 148 comprises essentially an integrating component. A corrective value for the air mass is determined by means of the function element 148 in dependence upon the difference between the air-mass desired value and the determined actual value of the air mass.

A line 150 leads from function element 148 to logic position 144 and line 142 also leads to logic position 144.

The correction value determined by element 148 for the air mass is added in the logic position 144 to the desired value. In this way, the effects of the variable air density on the engine control are compensated and the throttle-flap angle is so controlled that the difference between the desired air-mass value and the actual air-mass value disappears in steady state. The function element 148 defines then a controller which includes at least one integrating component, advantageously a component for the rapid control of the fine correction and a slowly adaptive component for steady-state deviations.

The corrected air-mass desired value is transmitted via line 152 to a characteristic field 154 and the actual value of the engine speed is supplied to the characteristic field 124 via the line 18. From the air-mass desired value and the engine speed, a desired value for the throttle-flap position is read out via interpolation. The desired value is supplied via line 50 to adjust the actuating device 52. This characteristic field is also determined and applied experimentally for the particular engine type.

In the same manner, quantities are determined for the fuel to be supplied or for the ignition time point. This is shown in FIG. 2 by the broken line 60/64.

From the foregoing, it can be determined that the pregiven coupling-torque desired value is adjusted via the measures provided by the invention in such a manner that the desired value is maintained constant independently of the operating conditions present.

Figure 3:
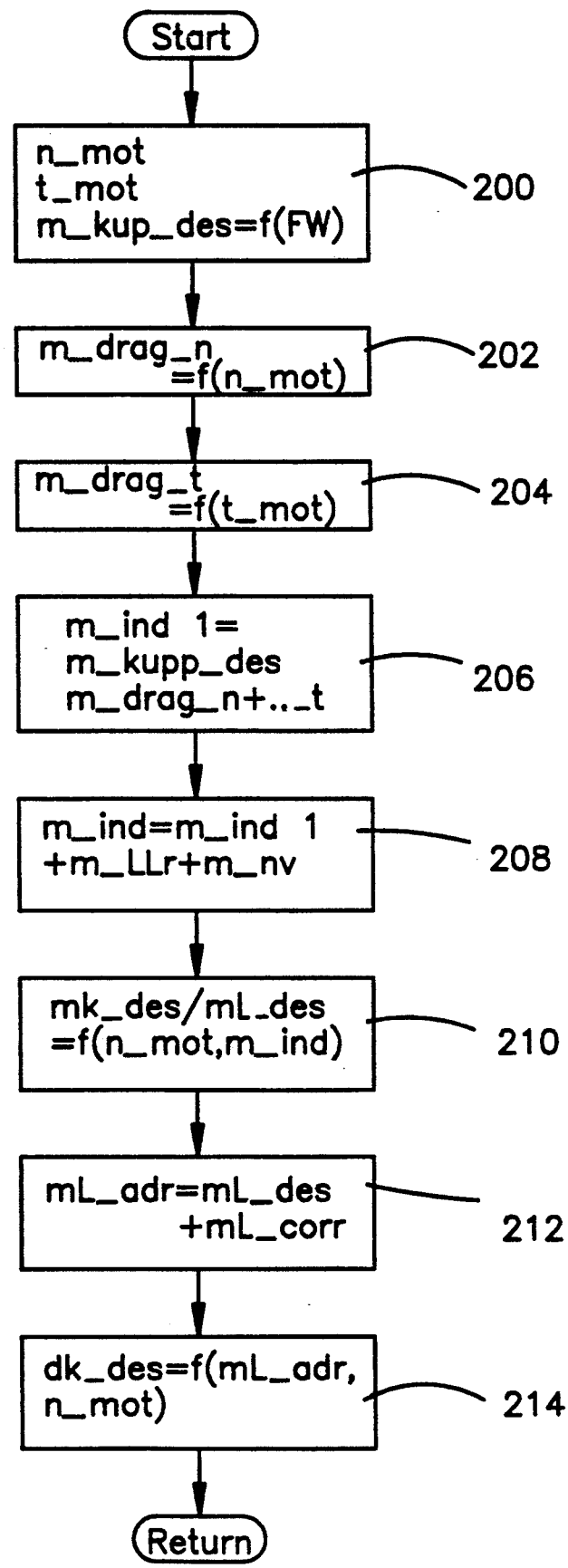
FIG. 3 is a flowchart for showing the procedure provided by the invention for determining the torque supplied by the engine.

FIG. 3 shows a flowchart to make this procedure clear and includes the individual computation steps.

A desired coupling torque is computed in a known manner based on the driver command FW and other parameters. This desired coupling torque defines the torque supplied by the engine to the coupling or torque converter for automatic motor vehicles. After the start of the subprogram shown in FIG. 3, this coupling-torque desired value (m_kup_des) is read in or computed in a first step 200 and the measured values of the actual rotational speed (n_mot) and the engine temperature (t_mot) are read in and the program is continued in step 202. There, the engine-speed dependent amount of the drag torque (m_drag_n) is determined in dependence upon the actual engine speed. In the next step 204, the temperature-dependent amount of the drag torque (m_drag _t) is determined in dependence upon engine temperature.

Thereafter, a coarse value for the indexed torque (m_indl) is computed in step 206 by adding the engine-speed dependent and temperature-dependent amounts of the drag torque and the coupling-torque desired value.

The additive amounts from additional consumers are added to this coarse value in step 208 and especially amounts of the idle controller (m_LLr) during engine idle as well as amounts of ancillary equipment (m_nv) such as air conditioner, generator, power steering, et cetera. The addition of all these amounts (for active ancillary consumers or for active idle controller) results in a value for the indexed torque (m_ind) in accordance with step 208 which is to be generated by adjusting the power parameters. The additive amounts for small consumers can be estimated and for heavy consumers such as for the air-conditioner compressor, the torque requirement can be determined experimentally and pregiven as a function of the particular operating condition and the engine speed.

From the value of the indexed torque determined in step 208, a desired value for the fuel mass (mk_des) or air mass (mL_des) is computed per work stroke while considering the engine speed over the fuel-mass characteristic field or air-mass characteristic field as described above.

For the case that, in step 210, only a desired value for the fuel mass is determined, an air-mass desired value can be computed via the determined desired value for the air-fuel ratio (for example, lambda=1). This desired value determined on the basis of the characteristic field in step 210 is corrected in step 212 in correspondence with the description provided above by means of the correction term for the variable air density (mL_corr) by addition so that an actual air-mass desired value (mL_adr) results.

This actual air-mass desired value is now processed together with the engine speed in step 214 in a characteristic field where a desired value for the throttle-flap position (dk_des) is formed by interpolation. This desired value is supplied to the actuator device for adjusting the throttle flap to the desired value. Correspondingly, and while considering the applied actual air quantity (actual air mass), an injection time can be computed from the desired value for the fuel mass.

In this way, the desired coupling torque is adjusted independently of the operating conditions present such as status of the consumers and/or air density.

In a comparative manner, and while using corresponding power parameters, the procedure described above can also be applied in combination with an electric motor as a drive or with other alternative drive concepts.

It is understood that the foregoing description is that of the preferred embodiments of the invention and that various changes and modifications may be made thereto without departing from the spirit and scope of the invention as defined in the appended claims.

What is claimed is:

1. A control system for a drive unit in a motor vehicle equipped with a motor having output parameters and ancillary devices, the control system comprising:

transducer means for supplying a signal indicative of the torque to be supplied by the motor in accordance with a command of the operator;

control means for adjusting at least one of said output parameters of the motor to influence said torque;

sensor means for supplying signals to said control means indicative of: motor speed, air input, motor temperature, an operating variable of the drive unit, an operating variable of the motor vehicle and operating variables of the ancillary devices; and, means for adjusting the output of the motor on the basis of said signals with said torque supplied by the motor being independent of the operating conditions present with the command of the operator being constant.

2. The control system of claim 1, further comprising means for determining said torque while considering efficiency of the motor; and, said torque being generated by the physical operation which generates the motor power.

3. The control system of claim 1, further comprising means for determining the torque to be developed for compensating for losses.

4. The control system of claim 1, said control means being adapted to predetermine said torque and to form values therefrom for said output parameters.

5. The control system of claim 1, wherein said torque to be adjusted is computed as the sum of a pregiven torque, a loss torque and a torque required by ancillary equipment and an idle controller.

6. The control system of claim 5, said loss torque is computed from a motor-speed dependent characteristic line or characteristic field for an operationally-warm motor and is corrected with a temperature-dependent value.

7. The control system of claim 6, wherein said characteristic line or characteristic field can be adapted.

8. The control system of claim 1, wherein a desired value is computed for the output parameter by means of a characteristic field as a function of the motor speed and the desired value for the motor torque to be adjusted.

9. The control system of claim 1, wherein said output parameter is at least one of the fuel mass and the air mass.

10. The control system of claim 9, wherein the desired value for the air mass is corrected by means of a controller; said desired value and a measure for the actual air mass are supplied to said controller; and, said controller generates an output signal for compensating for fluctuating air density.

11. The control system of claim 1, wherein said drive unit includes a controllable transmission.

* * * * *